United States Patent
Halope

(10) Patent No.: US 7,688,209 B2
(45) Date of Patent: Mar. 30, 2010

(54) RADIO FREQUENCY IDENTIFICATION DEVICE RESISTANT TO HUMID ENVIRONMENTS AND ITS MANUFACTURING METHOD

(75) Inventor: Christophe Halope, Cannes (FR)

(73) Assignee: ASK S.A., Sophia Antipolis (FR)

( * ) Notice: Subject to any disclaimer, the term of this patent is extended or adjusted under 35 U.S.C. 154(b) by 491 days.

(21) Appl. No.: 11/337,534

(22) Filed: Jan. 24, 2006

(65) Prior Publication Data

US 2006/0176181 A1 Aug. 10, 2006

(30) Foreign Application Priority Data

Jan. 24, 2005 (FR) .................................. 05 00689
Apr. 18, 2005 (FR) .................................. 05 03862

(51) Int. Cl.
*G08B 13/14* (2006.01)
(52) U.S. Cl. .............. 340/572.8; 340/572.4; 340/572.7; 235/492; 235/487; 235/385; 428/185; 428/343; 428/344
(58) Field of Classification Search .............. 340/572.8, 340/572.4, 572.7; 235/492, 487, 385; 428/195, 428/343, 344, 15
See application file for complete search history.

(56) References Cited

U.S. PATENT DOCUMENTS

| | | | |
|---|---|---|---|
| 5,528,222 A | 6/1996 | Moskowitz et al. | 340/572 |
| 5,786,626 A | 7/1998 | Brady et al. | 257/673 |
| 6,265,977 B1* | 7/2001 | Vega et al. | 340/572.7 |
| 6,562,454 B2* | 5/2003 | Takahashi et al. | 428/354 |
| 6,786,419 B2* | 9/2004 | Kayanakis | 235/492 |
| 2003/0136503 A1 | 7/2003 | Green et al. | 156/264 |
| 2003/0153120 A1 | 8/2003 | Halope | 438/106 |
| 2003/0168514 A1* | 9/2003 | Rancien et al. | 235/492 |
| 2005/0128085 A1* | 6/2005 | Bon | 340/572.7 |
| 2006/0017154 A1* | 1/2006 | Eguchi et al. | 257/701 |

FOREIGN PATENT DOCUMENTS

| | | |
|---|---|---|
| FR | 2824018 | 10/2002 |
| FR | 2824939 | 11/2002 |

* cited by examiner

*Primary Examiner*—Tai T Nguyen
(74) *Attorney, Agent, or Firm*—James C. Lydon

(57) ABSTRACT

The invention concerns a radio frequency identification device (RFID) featuring an antenna (12) screen-printed on a fibrous support and a chip (10) connected to the connection terminals (17 and 19) of the antenna. According to the main characteristic of the invention, a thermoplastic layer (22) and a layer of paper (24) are laminated on the antenna support (20) so that the antenna and the chip are trapped in the thermoplastic and so that the device is resistant to water and humid environments.

13 Claims, 3 Drawing Sheets

RADIO FREQUENCY IDENTIFICATION DEVICE RESISTANT TO HUMID ENVIRONMENTS AND ITS MANUFACTURING METHOD

BACKGROUND OF THE INVENTION

This invention concerns radio frequency identification devices designed to be affixed on objects such as security documents and specifically concerns a radio frequency identification device resistant to humid environments and its manufacturing method.

Contactless Radiofrequency Identification Devices (RFIDs) are increasingly used for identification of persons moving about in controlled access zones or transiting from one zone to another. A contactless RFID is a device made up of an antenna and a chip connected to the terminals of the antenna. The chip is usually not powered and receives its energy by an electromagnetic coupling between the antenna of the reader and the antenna of the RFID, information is exchanged between the RFID and the reader and particularly information stored in the chip that relates to the identification of the holder of the object on which the RFID is located and to his/her authorization to enter into a controlled access zone.

In this manner, passports can incorporate RFIDs to identify the passport holder. The chip memory contains information such as the identity of the passport holder, his/her country of origin, his/her nationality, visas of different countries visited, dates of entry, restrictions of movements, biometric elements, etc. The RFID device is generally incorporated into the bottom cover board of the passport. An antenna is then screen-printed using ink loaded with particles of silver on the reinforced bottom cover board of the passport cover. The chip is then connected by gluing to the connection terminals of the antenna. Then, the flyleaf of the quire of passport pages is laminated to the back of the reinforced top cover board. This embodiment has a drawback, as it is not waterproof and particularly cannot resist the passage of the passport through a washing machine. If the paper on which the antenna is screen-printed is not water resistant, the latter absorbs water and swells up, which causes fractures of the antenna and therefore a rupture of the electrical connection between the antenna and the chip.

This problem can be overcome by the use of an RFID device made up of a plastic "inlay". In this case, the inlay includes the antenna and the chip, the whole assembly being embedded in plastic layers. The inlay is then bonded between the flyleaf and the passport cover. One of the drawbacks of such an RFID device is the difference in material between the inlay and the passport. The latter being made of plastic, the bonding between the two is not optimal. Furthermore, a plastic inlay does not have the advantage of paper that can be delaminated over its thickness in case of an attempt to pull out and thereby destroy the RFID circuit.

BRIEF SUMMARY OF THE INVENTION

This is why the purpose of this invention is to counter these drawbacks by offering a radio frequency identification device with 2 external sides made of paper in which the antenna is installed in such a way that it can resist humidity and particularly an accidental passage through a washing machine.

Another object of the invention is to supply an identity booklet such as a passport integrating such a radio frequency identification device.

The purpose of the invention is thus a radio frequency identification device (RFID) featuring an antenna screen-printed on a fibrous support and a chip connected to the connection terminals of the antenna. According to the main characteristic of the invention, a thermoplastic layer and a layer of paper are laminated onto the antenna support so that the antenna and the chip are trapped in the thermoplastic and so that the device is resistant to water and humid environments.

Another purpose of the invention concerns a manufacturing method of a radio frequency identification device (RFID), the device featuring an antenna and a chip connected to the antenna, the method including the following steps:

screen printing an antenna featuring contacts on a paper support, placing adhesive dielectric material between the contacts of the antenna, positioning the chip on the support so that the chip's contacts are located opposite the antenna's contacts, connecting the chip to the antenna's contacts by exerting pressure on the chip, placing on the support a thermoplastic layer and a layer of paper, the thermoplastic layer being provided with a cavity at the location of the chip, laminating together the support, the thermoplastic layer and the paper layer to obtain an RFID device support.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE PREFERRED EMBODIMENTS

Figure 1:
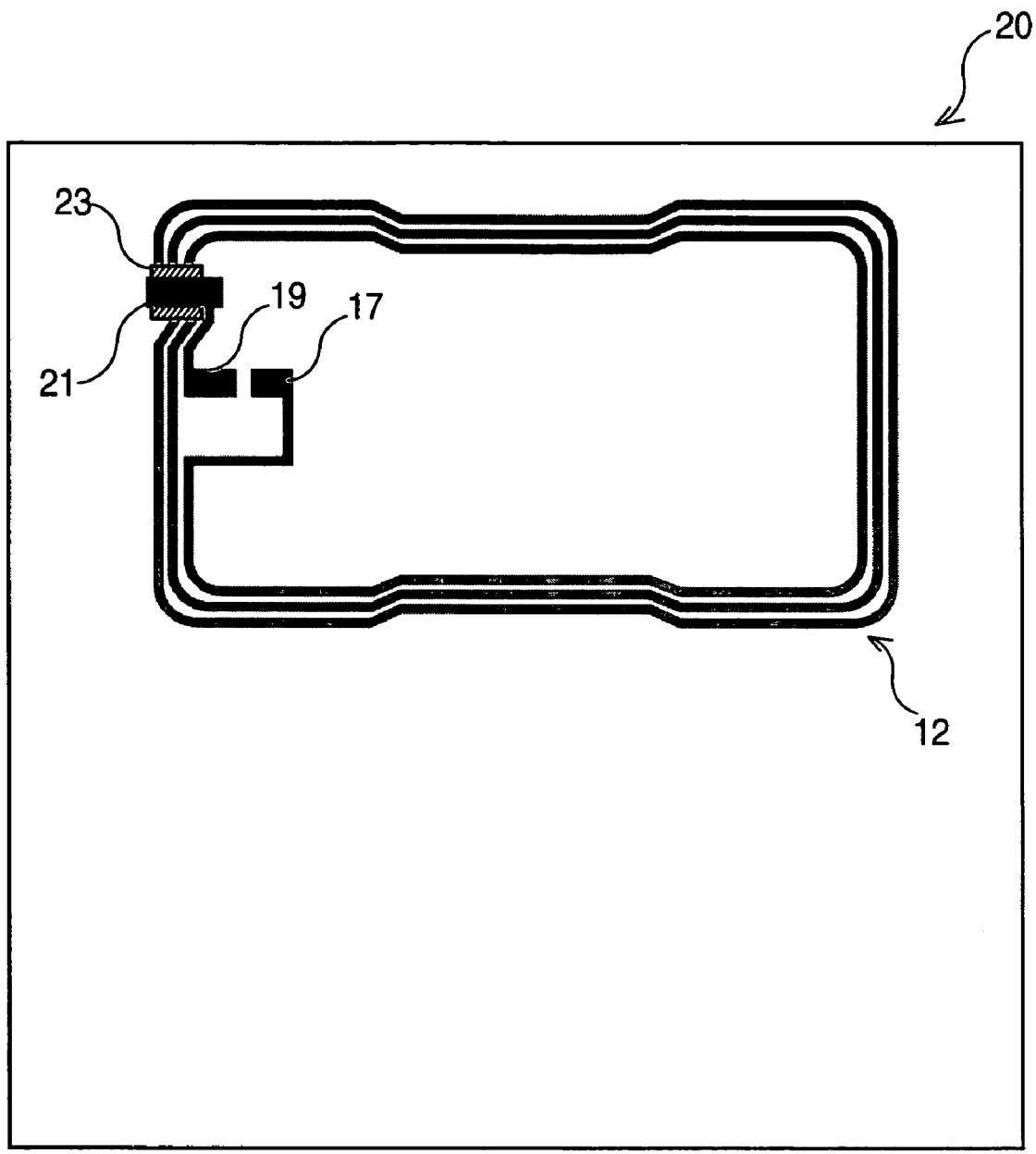
FIG. 1 represents the RFID device.

According to a preferred embodiment of the invention, the RFID device is adapted to be integrated into an identity booklet such as a passport. In reference to FIG. 1, an antenna support 20 made of cellulose fibre type fibrous material such as paper or synthetic fibre of thickness equal to about 80 μm and whose size corresponds to that of a closed passport is used. The antenna 12 that makes up an essential element of the RFID device consists of one or more turns screen printed with an electrically conductive polymer ink, loaded with conductive elements such as silver, copper or carbon. Each end of the antenna is connected to one of the two contacts 17 and 19 of the antenna which are also screen-printed. The turns are interconnected by an electric bridge 21 most commonly referred to as the "cross-over". An insulating strip 23 of dielectric ink is screen printed between the cross-over and some of the turns of the antenna 12 to allow the turns of the antenna to overlap without electrical contact. According to a preferred embodiment of the manufacturing process, the antenna is screen printed on this material in several steps. The first step consists in screen printing the turns of the antenna 12 and the two contacts 17 and 19 of the antenna. The second step consists in screen printing an insulating strip 23 to allow the turns of the antenna 12 to overlap. The third step consists in screen printing the electric bridge 21 which connects the outermost turn of the antenna 12 of the group of turns.

The next step consists in connecting the chip on the contacts of the antenna 12. An adhesive dielectric material is placed on the antenna support 20, between the two contacts 17 and 19 of the antenna 12. This adhesive material is applied before the chip is placed on the support, unlike the traditional "Flip Chip" process in which the adhesive is applied once the chip is connected. This step is thus much easier to perform and output is much better. The adhesive used is preferably epoxy resin that cross-links at 150° C. It is also possible to use cyanoacrylate type glue, which polymerises at ambient temperature.

Figure 2:
FIG. 2 represents a section of the antenna support on which the chip is placed.

Once the adhesive material has been applied, the chip 10 is positioned on the antenna support so that the chip's contacts 17 and 19 are opposite the antenna's contacts as shown in cross-section on FIG. 2. Pressure is then exerted on the chip 10 so that the non-deformable contacts of the chip sink into the contacts 17 and 19 of the antenna 12. Under the exerted pressure, the antenna's contacts are then deformed. The antenna's support 20 is compressed under the pressure exerted on the chip and can also get deformed. It is then noted that the contact surface between the chip's contacts and the contacts of the antenna 12 is maximum, even when the pressure is not being exerted any longer. The chip's contacts are preferably conical in shape. As a result of the pressure, the adhesive dielectric material 20 spreads and covers the entire surface of the chip between the contacts and penetrates into the depth of the antenna support. It thus enables the mechanical assembly between the chip 10 and the antenna support 20—and thereby the electric contact between the chip and the antenna—to be reinforced. The adhesive dielectric material used is preferably fluid and has a strong penetrating power. The support is then passed through an oven in order to cross-link the glue.

Figure 3:
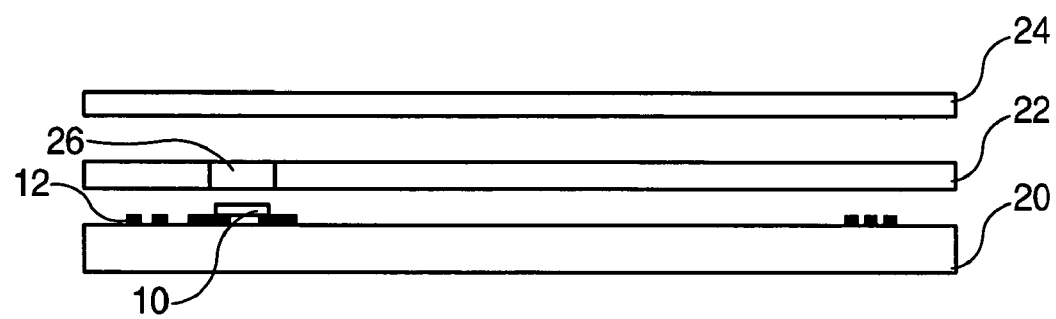
FIG. 3 represents the various layers that make up the RFID device.

Once the chip 10 is fixed to the support, the next step consists in laminating together the various layers that make up the support of the RFID device shown in FIG. 3 and consisting of the antenna support 20, a thermoplastic layer 22 and a layer of paper 24. The first layer 22 of thermoplastic material is placed on the support. The layer 22 is perforated with a through cavity 26. The thickness of the thermoplastic layer is such that it is greater than the thickness of the chip 10. The thermoplastic layer 22 is preferably of PVC or PETG and has a thickness greater than that of the chip. The cavity 26 is located so that the chip 10 is inside when the sheet 22 is placed on the support 20 and it is not in contact with the sheet 24 before lamination. The cavity 26 is preferably circular. For a chip of 150 µm thickness and 10 mm2 surface area, the thickness of the thermoplastic layer 22 used can be between 130 µm and 200 µm and the diameter of the cavity 26 is in the order of 6 mm.

Figure 4:
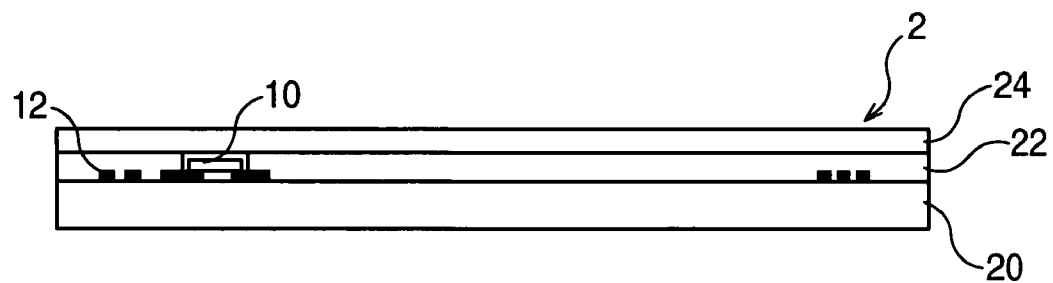
FIG. 4 represents a section of the RFID device.

The lamination step consists in welding by hot press moulding the layers 20, 22 and 24 that make up the support of the RFID device. The temperature and the pressure reached are in the order of 160° C. and 200 bar respectively. When the thermoplastic layer 22 has a thickness 30% greater than that of the chip, for example for a thermoplastic layer of 200 µm and a chip of 150 µm, the chip 10 is subjected to very little mechanical stress as the pressure that is exerted uniformly over the entire surface of the layer 22 is not exerted at the location of the cavity 26 made in the layer 22 in which the chip is housed; therefore, the pressure is not exerted on the chip 10. In this manner, the chip is not damaged and the efficiency is high. At these temperature and pressure values, the thermoplastic comprising the layer 22 becomes soft and liquefies while being trapped between the two layers of paper formed by the antenna support 20 and the layer of paper 24. During the lamination, the antenna support made of paper provides the device consisting of the antenna 10 and the chip 12 a stiffness and a cohesion that prevent any electrical rupture because the paper resists without getting deformed at temperatures and pressure of the lamination step. The support of the RFID device 2 made in this manner and shown in cross-section on FIG. 4 has a thickness of about 330 µm. The stiffened thermoplastic layer 22 has trapped the raised designs of the antenna support so that the antenna 10 and the chip 12 are embedded in the thermoplastic. A deliberate decohesion of the various layers 20, 22 and 24 will show that the antenna and the chip are moulded in the thermoplastic, the latter having covered the chip at the location of the cavity 26. In this manner, in a humid environment, it is the thermoplastic layer that provides the RFID device with a stiffness and cohesion that prevent any electrical rupture.

A variant consists in adapting the method in order to use a thermoplastic layer 22 whose thickness is not 30% greater than that of the chip but is less than this value, while obtaining the same efficiency. For example, for a thermoplastic layer in the order of 160 µm and for a chip of 150 µm thickness, the pressure exerted during the lamination step reaches the chip, and the mechanical stresses endured by the chip can damage it permanently. In this case, before the lamination step, a sheet of paper is superimposed on the layer of paper 24. This sheet being perforated with a through cavity whose surface area is greater than that of the chip, is placed so that the cavity is located in line with the chip 10, and as a result, the pressure exerted during the lamination step does not reach the chip as the pressure is exerted uniformly over the entire surface of the sheet but is not exerted at the location of the cavity placed above the location of the chip; therefore, pressure is not exerted on the chip 10. When the lamination step is complete, the sheet of paper added on top of the layer 24 is removed without any problem because the paper does not adhere to paper even under the effect of pressure and temperature.

In all cases, it is advantageous to use for the layers 20 and 24 paper containing synthetic fibres in order to reinforce its internal cohesion. The synthetic fibres used are for example nylon fibres in proportions in the order of 10 to 25%. Using a paper containing synthetic fibres prevents it from being delaminated over its thickness in a humid environment or after having stayed in water.

Figure 5:
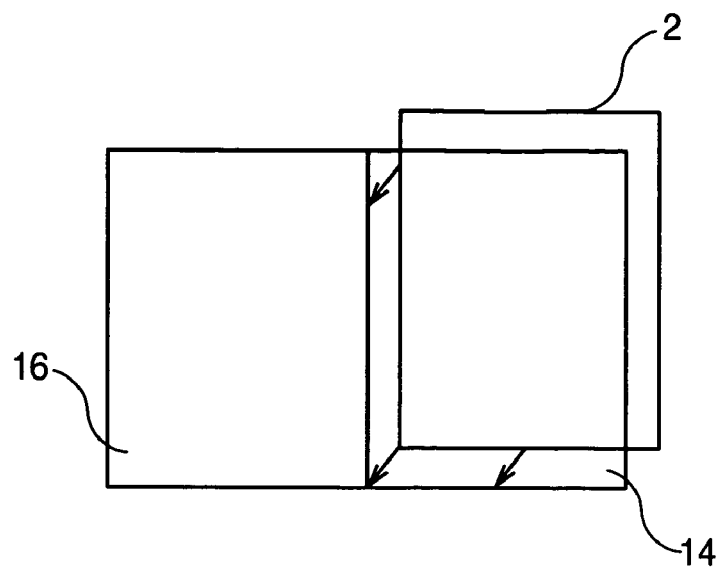
FIGS. 5 and 6 represent the installation of the RFID device in a passport.

The support of the RFID device 2 made by laminating the layers 20, 22 and 24 is shown in FIG. 5. The flexibility of the RFID device 2 obtained depends on the thickness of the thermoplastic layer used. The more the thickness of the thermoplastic layer is reduced, the more the RFID device 2 is flexible. The RFID device 2 is then glued on the side of the antenna support, on the bottom cover board 14 of the cover of the identity booklet. The bonding is done under pressure using a glue that, once dry, is insoluble in water. However, the support of the RFID device 2 as described can also be integrated by bonding one of its sides, preferably on the antenna support side, on any type of object such as clothes, books, paper documents, packaging, cartons, etc.

Figure 6:
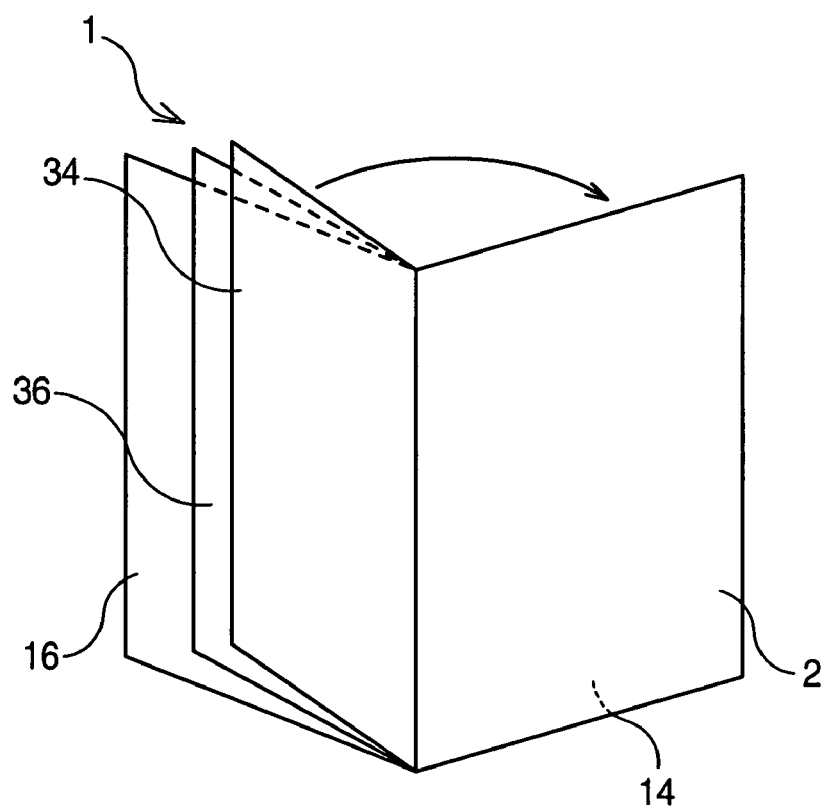

The identity booklet 1 represented diagrammatically in FIG. 6 is completely formed by installing the quire of inside pages. The manufacturing method consists in making the quire of inside pages by using a secure thread to connect them to one another. In the manufacture of a traditional passport, the flyleaves are laminated on the cover boards, the flyleaf 36 being laminated with the top cover board 16 while the bottom flyleaf 34 is laminated with the bottom cover board 14. The back of the bottom flyleaf 34 of the quire of pages of the identity booklet is pasted then pressed against the RFID device 2 glued on the bottom cover board of the booklet's cover, thus on the side of the paper layer 24. The glue used is preferably a glue that, once dry, becomes insoluble in water.

More generally, the support of the RFID device 2 is glued inside the booklet 1 using a glue which, once dry, is insoluble in water, and is then inserted between a cover board 14 or 16 of the identity booklet 1 and the flyleaf 34 and 36 located opposite. The support of the RFID device, and thus the RFID device, is preferably located between the bottom cover board 14 of the booklet cover and the back of the flyleaf 34. In order to maintain the same thickness over the entire booklet cover, it is also possible to laminate a support without the RFID device made up of a layer of paper, a thermoplastic layer and a layer of paper of the same thickness as the layers 20, 22 and 24 and to integrate it by gluing between the front of the flyleaf 36 and the cover board 16 of the booklet cover the while leaving a free strip of the cover at the location of the booklet's joint.

The use of paper in making the support of the RFID device is an indisputable advantage of the invention. The support of the RFID device has paper on both its sides, which simplifies bonding and optimises its integration on the identity booklet as the bonding is carried out paper against paper. Furthermore, using paper simplifies the lamination operation carried out at temperatures in the order of 160° C., as it is stable at these temperatures contrary to thermoplastic materials such as PVC or PETG.

The RFID device support and the RFID device may also be made in ISO format of smart cards so that they can be used to manufacture contactless smart cards. The two outer layers of paper and the PVC layer are in the ISA format of smart cards and the antenna is also adapted so that the size of turns is slightly less than the ISO format of smart cards. In this case, an additional step for the manufacturing method described above consists in customising the card by printing on one or both faces of the card.

According to a second embodiment not shown in the figures, the bottom cover board of the cover of the identity booklet may be used as an antenna support. In this case, the antenna is screen printed directly on the bottom cover board of the booklet, the chip is then connected to the antenna contacts and fixed to the support in the same manner as described previously on the antenna support 20. The two cover boards of the booklet are then covered with a thermoplastic layer, then a layer of paper so that the location of the booklet's joint is left free. At the location of the chip, the thermoplastic layer is pierced with a cavity so that the chip is inside it during lamination for the same reasons as those described in the first embodiment. The following step consists in laminating the cover, the thermoplastic layer as well as the paper layer, at a temperature of 160° C. and at a pressure of about 200 bar. The thickness of the thermoplastic layer chosen depends on the thickness of the chip that is used and the flexibility that is desired for the entire RFID device and cover. As for the first embodiment, a variant is possible and consists in adding a sheet of paper during the lamination step on top of the paper layer, the sheet of paper being perforated with a cavity in line with the chip. The use of this sheet being necessary only if the thickness of the thermoplastic layer is not 30% greater than the chip's thickness.

During the lamination or thereafter, the outside of the booklet's cover may be subjected to a plate having special raised designs to produce a particular grain on the cover to make the identity booklet tamper-resistant. This embodiment provides the RFID device with the same effects as those obtained for the first embodiment.

The identity booklet obtained has the same advantages as the one obtained by the first embodiment, namely it helps obtain an identity booklet with an RFID device resistant to humid environments and particularly to a passage through a washing machine. Furthermore, it is specifically advantageous to apply this embodiment to passports whose cover is made of reinforced paper. However, this embodiment is also applicable to passports whose cover is made of cloth.

The identity booklet according to both embodiments of the invention presents the advantage of being difficult to forge. When the antenna support is made of paper, when deliberately trying to remove the RFID device glued between the cover and the flyleaf, it turns out that it is the antenna support that gets delaminated in the middle. The antenna moulded in the thermoplastic layer remains on the side of the part of the delaminated support in contact with the thermoplastic layer whereas the chip remains on the other side of the part of the delaminated support (on the cover). In this way, the connection between the chip and the antenna is broken and the RFID device can no longer be used. The fact that the chip does not remain connected to the antenna contacts during deliberate delamination of the passport cover into which is inserted the RFID device, results from the fact that the glue used to attach the chip on the antenna support is fluid and has penetrated into the thickness of the support at sufficient depth to exceed the median surface along which the support delaminates. In this manner, the chip is driven on the side opposite the antenna given that the material used for screen printing the antenna does not penetrate deeply into the support.

Advantageously, the RFID device and the identity booklet according to the embodiments of the invention may be subjected to a passage through a washing machine without the electrical connection between the chip and the antenna being altered, thus maintaining for these items the ability to be read by electromagnetic coupling with a reader provided for this purpose.

The invention claimed is:

1. A radio frequency identification device (RFID) comprising an antenna screen printed on a fibrous antenna support and a chip connected to connection terminals of said antenna,
   wherein a thermoplastic layer and a layer of paper are laminated on the fibrous antenna support so that said antenna and said chip are trapped in the thermoplastic and so that the device is resistant to water and humid environments,
   wherein said chip is glued on said antenna support using an adhesive dielectric material so that contacts of the chip are located opposite the connection terminals of the antenna, and
   wherein said fibrous antenna support is a layer of paper, said support being capable of being integrated by bonding to any type of object.

2. The RFID device according to claim 1, wherein said adhesive dielectric material is an epoxy resin that cross-links at 150° C.

3. The RFID device according to claim 1, wherein the lamination is done at values of temperature and pressure in the order of 160° C. and 200 bar.

4. The RFID device according to claim 1, wherein said thermoplastic layer includes a cavity in which said chip is located.

5. The RFID device according to claim 1 made in ISO format of smart cards.

6. The smart card made according to claim 5 wherein one of the sides, or both sides, of the card is/are customized.

7. An identity booklet comprising an RFID device according to claim 1 wherein said antenna support is a bottom cover board of a cover of said booklet so that the RFID device is integrated between said cover board and a flyleaf of said booklet located opposite said cover board.

8. The identity booklet according to claim 7, wherein said support of the RFID device is integrated between a cover board of the booklet's cover and the flyleaf of the booklet located opposite said cover board.

9. The identity booklet according to claim 8, wherein said support of the RFID device is glued inside said identity booklet using a glue which, once dry is insoluble in water.

10. A method for manufacturing an identity booklet with a radio frequency identification device (RFID), said device featuring an antenna and a chip connected to the antenna integrated between the cover board of the booklet's cover and the flyleaf, said method including the following steps:
  screen printing an antenna having contacts on the identity booklet's cover board,
  placing adhesive dielectric material between the contacts of the antenna,
  positioning the chip on said cover board so that the chip's contacts are located opposite said contacts of the antenna,
  connecting the chip to the antenna's contacts by exerting pressure on the chip,
  placing on each of the cover boards of the booklet's cover, a thermoplastic layer, the layer being applied on top of said cover board comprising the antenna and the chip being provided with a cavity at the location of the chip,
  placing on each of said thermoplastic layers a layer of paper,
  laminating together the cover, the thermoplastic layers and the paper layers,
  installing the quire of inside pages.

11. The method according to claim 10, wherein, before the lamination step, a sheet of paper perforated with a through cavity is placed on the paper layer so that said cavity in the sheet of paper is located in line with said chip.

12. A method for manufacturing a radio frequency identification device (RFID), said device featuring an antenna and a chip connected to the antenna, said method including the following steps:
  screen printing an antenna having contacts on a support made of paper,
  placing adhesive dielectric material between said contacts of the antenna,
  positioning the chip on said support so that the contacts of said chip are located opposite said contacts of said antenna,
  connecting the chip to said contacts of said antenna by exerting pressure on the chip,
  placing on said support a thermoplastic layer and a layer of paper, the thermoplastic layer being provided with a cavity at the location of the chip,
  laminating together said support, the thermoplastic layer and the paper layer so that said antenna and said chip are trapped in the thermoplastic to obtain an RFID device that is resistant to water and to humid environments.

13. A method for manufacturing an identity booklet with a radio frequency identification device (RFID) according to claim 12, said device being integrated between the cover board of the booklet's cover and the flyleaf, said method including the following steps after the lamination step:
  gluing on the bottom cover board of the identity booklet's cover the support of the RFID device on the side of the antenna support,
  installing the quire of inside pages,
  gluing the front of the flyleaf against said support of the RFID device on the side of the paper layer.

* * * * *